(12) United States Patent
Saal et al.

(10) Patent No.: US 11,470,853 B2
(45) Date of Patent: Oct. 18, 2022

(54) INTERFACE AND APPLICATION FOR DESIGNING A CHOCOLATE-MAKING EXPERIENCE

(71) Applicant: CocoTerra Company, Palo Alto, CA (US)

(72) Inventors: Nathaniel Mark Saal, Palo Alto, CA (US); Karen Alter, Palo Alto, CA (US)

(73) Assignee: CocoTerra Company, Palo Alto, CA (US)

( * ) Notice: Subject to any disclaimer, the term of this patent is extended or adjusted under 35 U.S.C. 154(b) by 221 days.

(21) Appl. No.: 16/817,301

(22) Filed: Mar. 12, 2020

(65) Prior Publication Data

US 2020/0288741 A1    Sep. 17, 2020

Related U.S. Application Data

(60) Provisional application No. 62/826,549, filed on Mar. 29, 2019, provisional application No. 62/819,353, filed on Mar. 15, 2019.

(51) Int. Cl.
*A23G 1/00* (2006.01)
*G06F 3/0482* (2013.01)
*G06F 3/04817* (2022.01)

(52) U.S. Cl.
CPC .......... *A23G 1/002* (2013.01); *G06F 3/0482* (2013.01); *G06F 3/04817* (2013.01); *A23V 2002/00* (2013.01)

(58) Field of Classification Search
CPC .. A23G 1/002; A23G 1/0006; G06F 3/04817; G06F 3/0482; G06F 3/04847; G06F 3/0488; H04M 1/72403; H04M 1/72412
See application file for complete search history.

(56) References Cited

U.S. PATENT DOCUMENTS

| 746,664 A | 12/1903 | Bourdeau |
| 1,385,462 A | 7/1921 | Marvin et al. |

(Continued)

FOREIGN PATENT DOCUMENTS

| CN | 2731992 Y | 10/2005 |
| DE | 661846 C | 6/1938 |

(Continued)

OTHER PUBLICATIONS

United States Office Action, U.S. Appl. No. 16/533,630, filed Oct. 13, 2021, 15 pages.

(Continued)

*Primary Examiner* — Cao H Nguyen
(74) *Attorney, Agent, or Firm* — Fenwick & West LLP

(57) ABSTRACT

Provided herein are exemplary embodiments including a computing device comprising a processor, a memory and a display, the computing device being configured to dynamically display a specific, structured interactive graphical user interface paired with a prescribed functionality directly related to the interactive graphical user interface's structure, the specific structured interactive graphical user interface configured to receive input information including an entry of a desired type of food to be prepared, and a desired characteristic of the food, the computing device processor automatically generating a food preparation parameter based on the received input information, and the computing device processor automatically generating a custom recipe for preparation of the food. Additionally, the specific structured interactive graphical user interface may be configured to receive an entry to modify the food preparation parameter or the custom recipe.

21 Claims, 14 Drawing Sheets

(56) References Cited

U.S. PATENT DOCUMENTS

| | | |
|---|---|---|
| 2,081,888 A | 5/1937 | Birdsall |
| 2,208,239 A | 7/1940 | Andersen |
| 2,218,234 A | 10/1940 | Fisher |
| 2,229,168 A | 1/1941 | Carroll |
| 2,238,971 A | 4/1941 | Carroll |
| 2,533,875 A | 12/1950 | Cavalieri |
| 2,558,128 A | 6/1951 | Edwards |
| 2,711,964 A | 6/1955 | Hermann |
| 2,784,095 A | 3/1957 | Denis et al. |
| 2,786,502 A | 3/1957 | Turner |
| 2,915,024 A | 12/1959 | Otto |
| 2,982,655 A | 5/1961 | Budd |
| 3,167,035 A | 1/1965 | Benson |
| 3,253,344 A | 5/1966 | Van Gelder |
| 3,263,592 A | 8/1966 | Hickey |
| 3,323,320 A | 6/1967 | Conz |
| 3,388,046 A | 6/1968 | Hendrix |
| 3,537,386 A | 11/1970 | Grosbard |
| 3,607,313 A | 9/1971 | Roth |
| 3,610,133 A | 10/1971 | Mies et al. |
| 3,634,106 A | 1/1972 | Organ et al. |
| 3,648,904 A | 3/1972 | Teige |
| 3,649,290 A | 3/1972 | Angold |
| RE27,405 E | 6/1972 | Ehe et al. |
| 3,690,247 A | 9/1972 | Van Cleven et al. |
| 3,722,401 A | 3/1973 | Davidson et al. |
| 3,739,711 A | 6/1973 | Nieblach |
| 3,858,546 A | 1/1975 | Benson et al. |
| 3,946,658 A | 3/1976 | Smith |
| 3,952,538 A | 4/1976 | Warlick |
| 4,132,162 A | 1/1979 | Magnuson |
| 4,175,690 A | 11/1979 | Bova et al. |
| 4,283,012 A | 8/1981 | Hanson |
| 4,293,570 A | 10/1981 | Vadasz |
| 4,301,719 A | 11/1981 | Gerow |
| 4,332,643 A | 6/1982 | Reid |
| 4,357,111 A | 11/1982 | Honemeyer et al. |
| 4,538,509 A | 9/1985 | Ojima et al. |
| 4,538,978 A | 9/1985 | Cerboni |
| 4,613,294 A | 9/1986 | Rose et al. |
| 4,628,803 A | 12/1986 | Bonora et al. |
| 4,649,810 A | 3/1987 | Wong |
| 4,664,529 A | 5/1987 | Cavalli |
| 4,679,498 A | 7/1987 | Chaveron et al. |
| 4,693,610 A | 9/1987 | Weiss |
| 4,704,035 A | 11/1987 | Kowalczyk |
| 4,763,568 A | 8/1988 | Kiczek |
| 4,773,233 A | 9/1988 | Kawasumi et al. |
| 4,827,732 A | 5/1989 | Suyama et al. |
| 4,838,702 A | 6/1989 | Torimitsu et al. |
| 4,860,461 A | 8/1989 | Tamaki et al. |
| 4,877,410 A | 10/1989 | Renzulli et al. |
| 4,884,626 A | 12/1989 | Filipowski |
| 4,903,588 A | 2/1990 | Horiuchi et al. |
| 4,903,589 A | 2/1990 | Aoyama |
| 4,917,910 A | 4/1990 | Hsieh et al. |
| 4,960,043 A | 10/1990 | van Lengerich |
| 4,993,593 A | 2/1991 | Fabiano et al. |
| 4,998,678 A | 3/1991 | Durr |
| 5,010,838 A | 4/1991 | Simelunas et al. |
| 5,152,212 A | 10/1992 | Chauveau |
| 5,302,201 A | 4/1994 | Lucke |
| 5,351,609 A | 10/1994 | Muntener |
| 5,363,746 A | 11/1994 | Gordon |
| 5,403,395 A | 4/1995 | McCullough et al. |
| 5,412,171 A | 5/1995 | Yahav et al. |
| 5,460,209 A | 10/1995 | Jandura et al. |
| 5,476,550 A | 12/1995 | Walker |
| 5,495,418 A | 2/1996 | Latini et al. |
| 5,520,457 A | 5/1996 | Gontero et al. |
| 5,605,090 A | 2/1997 | Mantani et al. |
| 5,613,428 A | 3/1997 | Kendall et al. |
| 5,615,951 A | 4/1997 | Gabriele |
| 5,617,774 A | 4/1997 | LaVelle et al. |
| 5,655,313 A | 8/1997 | Hope et al. |
| 5,657,687 A | 8/1997 | Callebaut et al. |
| 5,698,252 A | 12/1997 | Kelly et al. |
| 5,755,880 A | 5/1998 | Norman et al. |
| 5,771,600 A | 6/1998 | Romanow |
| 5,802,959 A | 9/1998 | Benson et al. |
| 5,855,165 A | 1/1999 | Herrick, IV |
| 5,858,431 A | 1/1999 | Wiedersatz |
| 5,876,775 A | 3/1999 | Behnke et al. |
| 5,911,827 A | 6/1999 | Heller |
| 5,934,177 A | 8/1999 | Takeda et al. |
| 5,972,398 A | 10/1999 | Ludwig et al. |
| 6,003,240 A | 12/1999 | Akimoto et al. |
| 6,007,418 A | 12/1999 | Suhner |
| 6,007,859 A | 12/1999 | Taylor et al. |
| 6,056,988 A | 5/2000 | Bangerter et al. |
| 6,065,395 A | 5/2000 | Sollich |
| 6,079,319 A | 6/2000 | Doria |
| 6,103,285 A | 8/2000 | Guzman et al. |
| 6,105,485 A | 8/2000 | Zittel |
| 6,129,008 A | 10/2000 | Muntener |
| 6,145,432 A | 11/2000 | Bellue, Jr. |
| 6,159,527 A | 12/2000 | Wettlaufer |
| 6,180,158 B1 | 1/2001 | Zietlow et al. |
| 6,221,422 B1 | 4/2001 | Kruger et al. |
| 6,238,724 B1 | 5/2001 | Carvallo et al. |
| 6,267,049 B1 | 7/2001 | Silvano |
| 6,318,112 B1 | 11/2001 | Lennox, III |
| 6,321,641 B1 | 11/2001 | Wang |
| 6,401,599 B1 | 6/2002 | Maeda et al. |
| 6,427,584 B1 | 8/2002 | Thomas et al. |
| 6,460,451 B1 | 10/2002 | Helman et al. |
| 6,588,363 B1 | 7/2003 | Burke et al. |
| 6,638,550 B2 | 10/2003 | Banko et al. |
| 6,679,402 B1 | 1/2004 | D'Alayer De Costemore D'Arc |
| 6,718,867 B2 | 4/2004 | Hatakeyama |
| 6,755,149 B2 | 6/2004 | Herman |
| 6,840,664 B2 | 1/2005 | Burke et al. |
| 6,913,773 B2 | 7/2005 | Degady |
| 6,997,134 B2 | 2/2006 | Bayus et al. |
| 7,055,455 B2 | 6/2006 | Burke |
| 7,153,533 B2 | 12/2006 | Burke |
| 7,191,698 B2 | 3/2007 | Bond et al. |
| 7,270,156 B2 | 9/2007 | Beesley et al. |
| 7,350,457 B2 | 4/2008 | Wessels et al. |
| 7,537,792 B2 | 5/2009 | Niekerk |
| 7,681,818 B2 | 3/2010 | Peterson et al. |
| 7,721,463 B2 | 5/2010 | Leon |
| 7,867,537 B2 | 1/2011 | Karwowski et al. |
| 7,878,109 B2 | 2/2011 | Calzada et al. |
| 8,307,758 B2 | 11/2012 | Kobayashi et al. |
| 8,323,711 B2 | 12/2012 | Brandt, Jr. et al. |
| 8,460,731 B2 | 6/2013 | Mazin |
| 8,603,259 B2 | 12/2013 | Berner et al. |
| 8,707,862 B1 | 4/2014 | Oliver et al. |
| 8,726,790 B2 | 5/2014 | Lane et al. |
| 8,808,511 B2 | 8/2014 | Malatesta |
| 8,813,635 B2 | 8/2014 | Dragan |
| 8,906,442 B2 | 12/2014 | Stauffacher et al. |
| 9,930,986 B2 | 4/2018 | Arai et al. |
| 10,463,057 B2 | 11/2019 | Saal et al. |
| 2002/0009517 A1 | 1/2002 | Degady et al. |
| 2002/0086091 A1 | 7/2002 | Degady et al. |
| 2002/0086092 A1 | 7/2002 | Niekerk et al. |
| 2002/0174779 A1 | 11/2002 | Friedl et al. |
| 2004/0022908 A1 | 2/2004 | Kanaya et al. |
| 2004/0043122 A1 | 3/2004 | Yakushigawa et al. |
| 2004/0055474 A1 | 3/2004 | Lekic et al. |
| 2004/0144263 A1 | 7/2004 | van Esbroeck et al. |
| 2004/0249249 A1 | 12/2004 | Lawson et al. |
| 2005/0092194 A1 | 5/2005 | Bajema et al. |
| 2005/0115597 A1 | 6/2005 | Carhuff et al. |
| 2005/0283053 A1 | 12/2005 | DeCharms |
| 2006/0009697 A1 | 1/2006 | Banet et al. |
| 2007/0061735 A1 | 3/2007 | Hoffberg et al. |
| 2007/0095216 A1 | 5/2007 | Zittel et al. |
| 2007/0202241 A1 | 8/2007 | Abaurre |
| 2007/0208263 A1 | 9/2007 | John et al. |
| 2007/0219455 A1 | 9/2007 | Nong et al. |
| 2008/0029131 A1 | 2/2008 | Ecker |

(56) References Cited

U.S. PATENT DOCUMENTS

| | | |
|---|---|---|
| 2008/0264273 A1 | 10/2008 | Stousland |
| 2008/0274263 A1 | 11/2008 | Mazin |
| 2008/0317907 A1 | 12/2008 | Thomas et al. |
| 2009/0018405 A1 | 1/2009 | Katsumura et al. |
| 2009/0202687 A1 | 8/2009 | Griego et al. |
| 2009/0214733 A1 | 8/2009 | Garwood |
| 2009/0223385 A1 | 9/2009 | Heald |
| 2010/0043649 A1 | 2/2010 | Maupin et al. |
| 2010/0049004 A1 | 2/2010 | Edman et al. |
| 2010/0050885 A1 | 3/2010 | Vanderstegen-Drake |
| 2010/0095852 A1 | 4/2010 | Remo et al. |
| 2010/0107887 A1 | 5/2010 | Bentley et al. |
| 2010/0151087 A1 | 6/2010 | Dumarche et al. |
| 2010/0159112 A1 | 6/2010 | Madsen et al. |
| 2011/0034712 A1 | 2/2011 | Lin |
| 2011/0041706 A1 | 2/2011 | Whetstone |
| 2011/0048253 A1 | 3/2011 | Melandri et al. |
| 2011/0055044 A1* | 3/2011 | Wiedl .............. G06Q 30/0621 705/26.5 |
| 2011/0104346 A1 | 5/2011 | Bowsman et al. |
| 2011/0147507 A1 | 6/2011 | van Leverink |
| 2011/0183049 A1 | 7/2011 | Simbuerger et al. |
| 2011/0212238 A1 | 9/2011 | Rose et al. |
| 2011/0252981 A1 | 10/2011 | Isenberg et al. |
| 2011/0256277 A1 | 10/2011 | Bows et al. |
| 2011/0300286 A1 | 12/2011 | Godfrey et al. |
| 2012/0015085 A1 | 1/2012 | Liberatore |
| 2012/0171344 A1 | 7/2012 | Rasanayagam et al. |
| 2012/0225173 A1 | 9/2012 | Larson |
| 2012/0251688 A1 | 10/2012 | Zimmerman et al. |
| 2012/0260808 A1 | 10/2012 | Thomas |
| 2012/0282371 A1 | 11/2012 | Miller |
| 2013/0055907 A1 | 3/2013 | Brandt, Jr. |
| 2013/0098847 A1 | 4/2013 | Lambert et al. |
| 2013/0142924 A1 | 6/2013 | Liberatore |
| 2013/0340629 A1 | 12/2013 | Jetton et al. |
| 2014/0026765 A1 | 1/2014 | Fou et al. |
| 2014/0199454 A1 | 7/2014 | Storek et al. |
| 2014/0251161 A1 | 9/2014 | Matsushima et al. |
| 2014/0295382 A1* | 10/2014 | Ko ......................... G06Q 50/00 434/127 |
| 2014/0335481 A1* | 11/2014 | Butler .................... G16H 20/60 434/127 |
| 2015/0118374 A1 | 4/2015 | Kruiver |
| 2015/0297020 A1 | 10/2015 | Castelli et al. |
| 2016/0005327 A1* | 1/2016 | Young .................... G09B 19/00 434/127 |
| 2016/0007638 A1 | 1/2016 | Fukumori et al. |
| 2016/0174748 A1* | 6/2016 | Baldwin ............... A47J 27/004 426/231 |
| 2016/0205963 A1 | 7/2016 | Saal et al. |
| 2019/0357559 A1 | 11/2019 | Saal et al. |

FOREIGN PATENT DOCUMENTS

| | | |
|---|---|---|
| EP | 0140729 B1 | 4/1988 |
| EP | 0369066 A1 | 5/1990 |
| EP | 0796563 A2 | 9/1997 |
| EP | 1733625 B1 | 8/2008 |
| EP | 2187757 B1 | 12/2013 |
| EP | 3244748 A1 | 11/2017 |
| EP | 3244748 B1 | 11/2019 |
| EP | 3653060 A2 | 5/2020 |
| FR | 1033457 A | 7/1953 |
| JP | S47033150 B1 | 8/1972 |
| JP | S62195877 A | 8/1987 |
| JP | H02023833 A | 1/1990 |
| JP | 2007274912 A | 10/2007 |
| JP | 200980651 A | 4/2009 |
| JP | 2018503400 A | 2/2018 |
| JP | 6463508 B | 2/2019 |
| JP | 2019062908 | 4/2019 |
| JP | 6672448 B2 | 3/2020 |
| KR | 1020130138076 A | 12/2013 |
| WO | WO20100068301 A1 | 2/2011 |
| WO | WO2013110795 A1 | 8/2013 |
| WO | WO2016115557 A1 | 7/2016 |

OTHER PUBLICATIONS

Schumacher et al., "Development and evaluation of a laboratory scale conch for chocolate production", International Journal of Food Science and Technology, 2009, vol. 44, pp. 616-622.

"International Search Report" & "Written Opinion", Patent Cooperation Treaty Application No. PCT/US2016/013806, dated Mar. 28, 2016, 15 pages.

"Extended European Search Report", European Patent Convention Application No. 16738035.1, dated Jul. 19, 2018, 5 pages.

"Search Report", Japanese Patent Application No. 2017-556783, dated Jun. 12, 2018, 24 pages [40 pages with translation].

"Office Action", Japanese Patent Application No. 2017-556783, dated Jul. 30, 2018, 3 pages [6 pages with translation].

"Notice of Allowance", Japanese Patent Application No. 2017-556783, dated Oct. 30, 2018, 3 pages [6 pages with translation].

"Notice of Allowance", European Patent Convention Application No. 16738035.1, dated Jun. 27, 2019, 5 pages.

"Notice of Allowance", Japanese Patent Application No. 2018-247833, dated Feb. 4, 2020, 3 pages [4 pages with translation].

"Extended European Search Report", European Patent Convention Application No. 19211088.0, dated Jul. 6, 2020, 9 pages.

* cited by examiner

INTERFACE AND APPLICATION FOR DESIGNING A CHOCOLATE-MAKING EXPERIENCE

CROSS REFERENCE TO RELATED APPLICATIONS

This application claims the priority benefit of U.S. Provisional Patent Application Ser. No. 62/819,353 filed on Mar. 15, 2019 titled "CocoTerra Experiences," and this application claims the priority benefit of U.S. Provisional Patent Application Ser. No. 62/826,549 filed on Mar. 29, 2019 titled "Interface and Application for Designing a Chocolate-Making Experience," both of which are hereby incorporated by reference in their entireties.

This application is related to U.S. Pat. No. 10,463,057 (Ser. No. 14/997,983) as filed on Jan. 18, 2016 and issued on Nov. 5, 2019, titled "Chocolate Processing System and Method," and this application is related to U.S. Ser. No. 16/533,630 as filed on Aug. 6, 2019, titled "Chocolate Processing System and Method," both of which are hereby incorporated by reference in their entireties.

FIELD OF INVENTION

The present technology pertains to systems and methods for interactive food, chocolate, spread and drink experiences.

SUMMARY

Provided herein are exemplary embodiments including a computing device comprising a processor, a memory and a display, the computing device being configured to dynamically display a specific, structured interactive graphical user interface paired with a prescribed functionality directly related to the interactive graphical user interface's structure, the specific structured interactive graphical user interface configured to receive input information including an entry of a desired type of food to be prepared, and a desired characteristic of the food, the computing device processor automatically generating a food preparation parameter based on the received input information, and the computing device processor automatically generating a custom recipe for preparation of the food. Additionally, the specific structured interactive graphical user interface may be configured to receive an entry to modify the food preparation parameter or the custom recipe.

In other exemplary embodiments, the desired characteristic may include appearance, flavor, texture, nutrition or aroma. In some exemplary embodiments, the food is chocolate. The computing device may transmit the custom recipe to a food preparation machine and/or transmit the custom recipe to a server system. Additionally, the saving, storing, and synchronizing of the custom recipe may take place on the computing device, a server system and a food preparation machine. The custom recipe may include an ingredient, an amount of the ingredient, a user instruction or the food preparation parameter to prepare the food. The food preparation parameter may include an instruction for grinding, refining, conching, tempering, or molding.

The computing device, in various exemplary embodiments, is configured to receive ingredient information from a scan of a package for an ingredient or from purchase of an ingredient from an e-commerce source and to automatically generate a recipe or select an existing recipe. Additionally, the computing device may be configured to automatically purchase an ingredient from an e-commerce source based on the recipe. The specific structured interactive graphical user interface may be configured for an order of addition of ingredients to be modified. The food preparation machine may automatically transmit to the computing device's specific structured interactive graphical user interface a status of processing the food or transmitting an instruction for the executing of the custom recipe.

Further exemplary embodiments may include a computing device comprising a processor, a memory and a display, the computing device being configured to dynamically display a specific, structured interactive graphical user interface paired with a prescribed functionality directly related to the interactive graphical user interface's structure, the specific structured interactive graphical user interface configured to receive an entry of a desired amount and type of an ingredient for making a food, the specific structured interactive graphical user interface configured to receive an entry of a desired processing parameter for the food and the processor automatically generating a custom recipe including the processing parameter for the preparation of the food. The computing device may transmit the custom recipe to a food preparation machine, with the food preparation machine having an optional display configured to dynamically display a specific, structured interactive graphical user interface paired with a prescribed functionality directly related to the interactive graphical user interface's structure. The computing device may automatically determine if the custom recipe fails to satisfy a predetermined standard for successful processing, with the standard comprising a speed, a temperature, an ingredient, an ingredient ratio, or a processing time.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
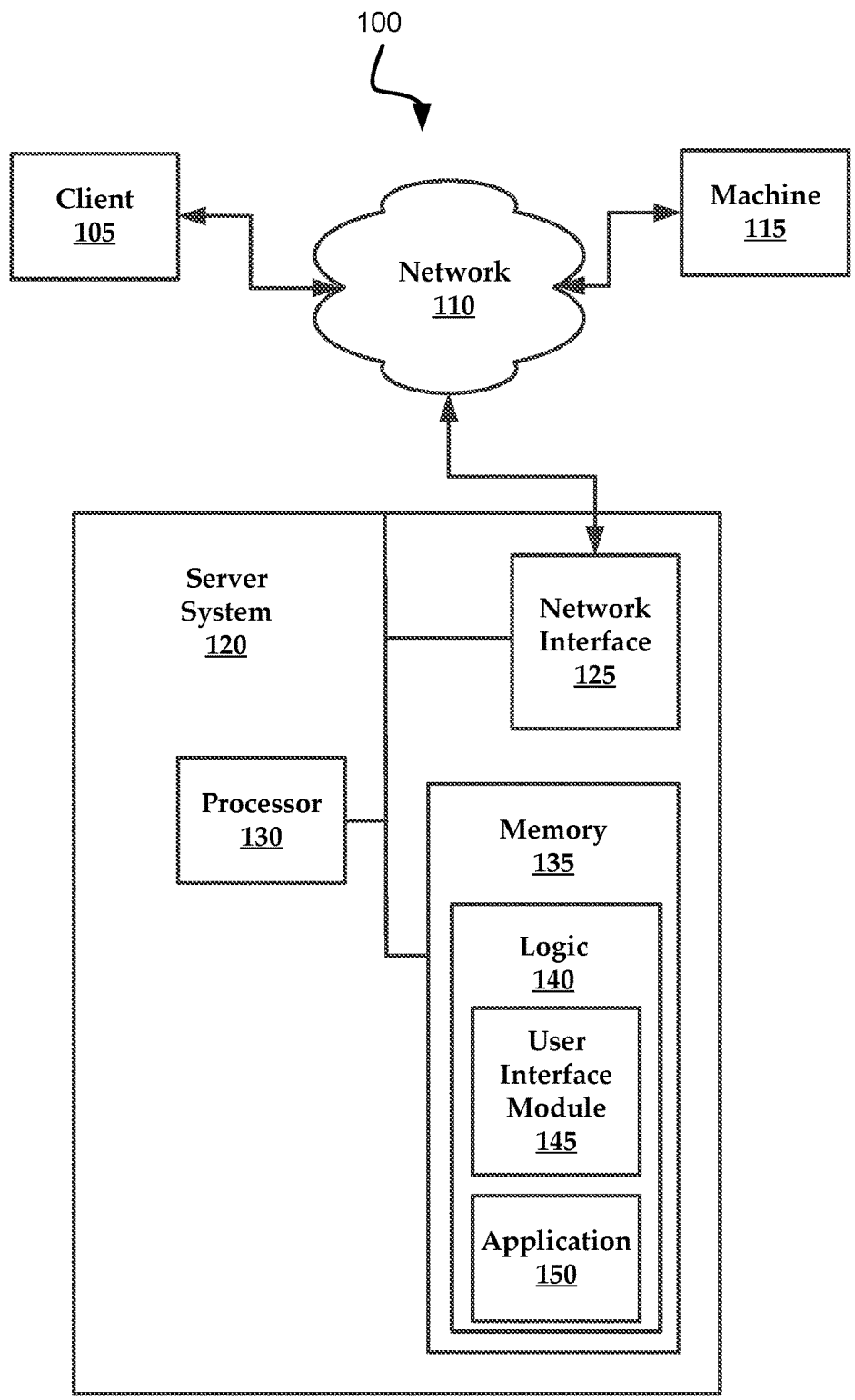
FIG. 1 is an exemplary system that can be used to practice aspects of the present technology.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 illustrates an exemplary architecture 100 for practicing aspects of the present technology. The architecture comprises a server system, hereinafter "system 120" that is configured to provide various functionalities, which are described in greater detail throughout this document. Generally the system 120 is configured to communicate with client devices, such as client 105 and with other devices, such as machine 115, which in some exemplary embodiments is a chocolate making machine or a food preparation machine. The client 105 may include, for example, a mobile device, laptop computer, tablet, smart watch, etc. or combinations thereof. However, client 105 and machine 115 may also operate independently of system 120.

The system 120 may communicatively couple with the client 105 via a public or private network, such as network 110. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The system 120 generally comprises a processor 130, a network interface 125, and a memory 135. According to some embodiments, the memory 135 comprises logic (e.g., instructions, algorithms, etc.) 140 that can be executed by the processor 130 to perform various methods. For example, the logic may include a user interface module 145 as well as a data aggregation and correlation application (hereinafter application 150) that may reside on the client 105, server system 120 and/or machine 115. The application 150 is configured to provide the functionalities described in greater detail herein. The memory 135 may further comprise a database that includes such information as user accounts, machines and recipes, as well as the usage events of all three.

It will be understood that the functionalities described herein, which are attributed to the system 120 and application 150 may also be executed within the client 105 and machine 115. That is, the client 105 and machine 115 may be programmed to execute the functionalities described herein. In other instances, the system 120, machine 115, and client 105 may cooperate to provide the functionalities described herein, such that the client 105 and machine 115 are provided with a client-side application that interacts with the system 120 such that the system 120, client 105, and machine 115 operate in a client/server relationship. Complex computational features may be executed by the server 120, while simple operations that require fewer computational resources may be executed by the client 105 and machine 115, such as data gathering and data display.

In general, the user interface module 145 may be executed by the system 120 to provide various graphical user interfaces (GUIs) that allow users and system administrators to interact with the system 120. In some instances, GUIs are generated by execution of the application 150 itself. Users may interact with the system 120 using, for example, a client 105 and/or machine 115. The system 120 may generate web-based interfaces for the client 105 and/or machine 115. Client 105 may also generate web-based interfaces for other clients and devices.

In other exemplary embodiments, client 105, machine 115 and server system 120 may be fully contained standalone systems, with some or all of them not connected to a network. That is, they may each comprise interactive graphical user interfaces, network interface, processor, memory, logic and an application. With the exception of the ability to produce food, the client 105, machine 115 and server system 120 may function interchangeably and be synchronized. Further, any number of clients, machines and or server systems may function together in a interchangeable and synchronized fashion.

Figure 2:
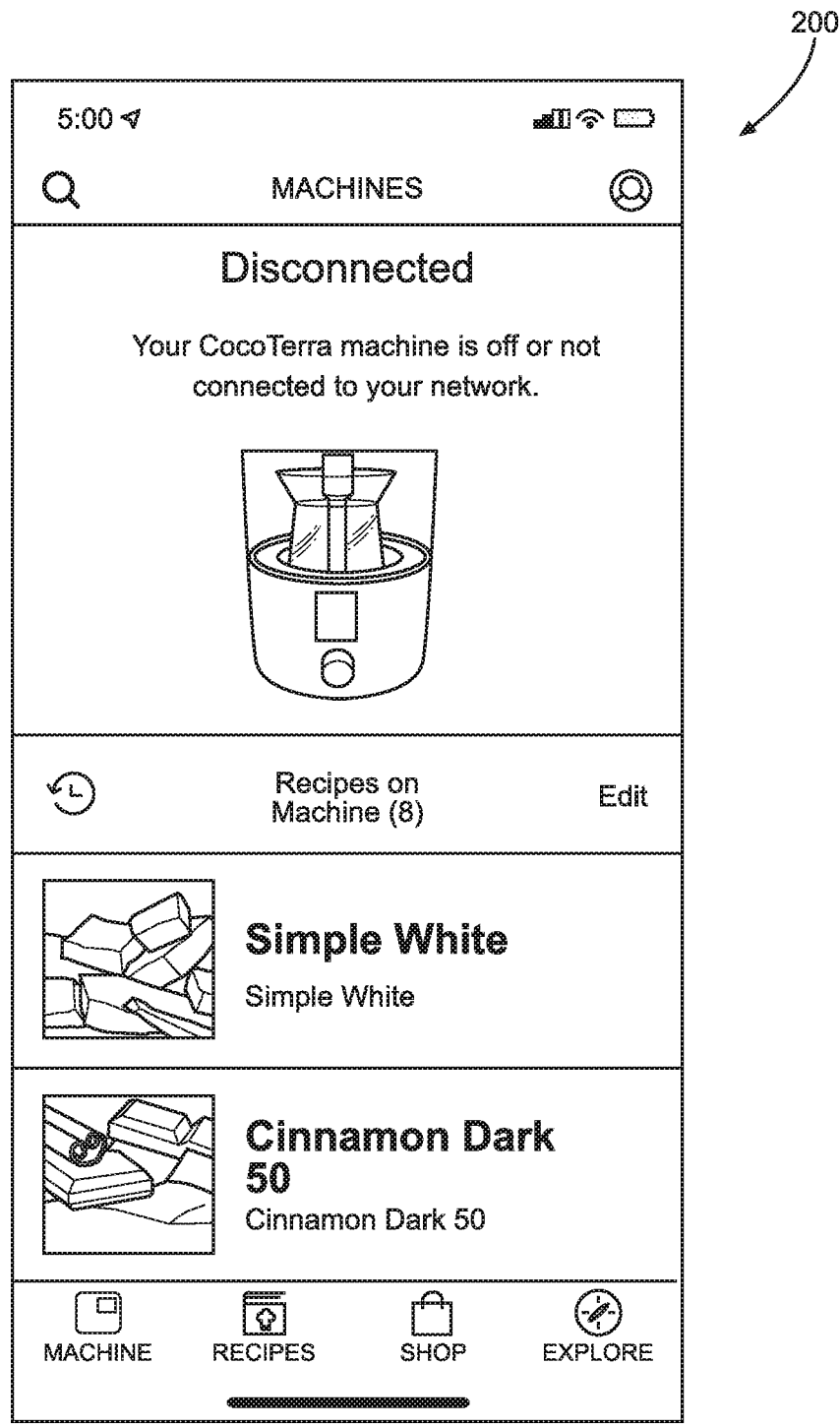
FIG. 2 is an exemplary view of an interactive graphical user interface for machine status.

FIG. 2 is an exemplary view of an interactive graphical user interface 200 for machine 115 status and a method for selecting and managing chocolate recipes. Please note that the exemplary embodiments described and illustrated herein are not limited to chocolate making and may be employed for making other types of food.

Figure 3:
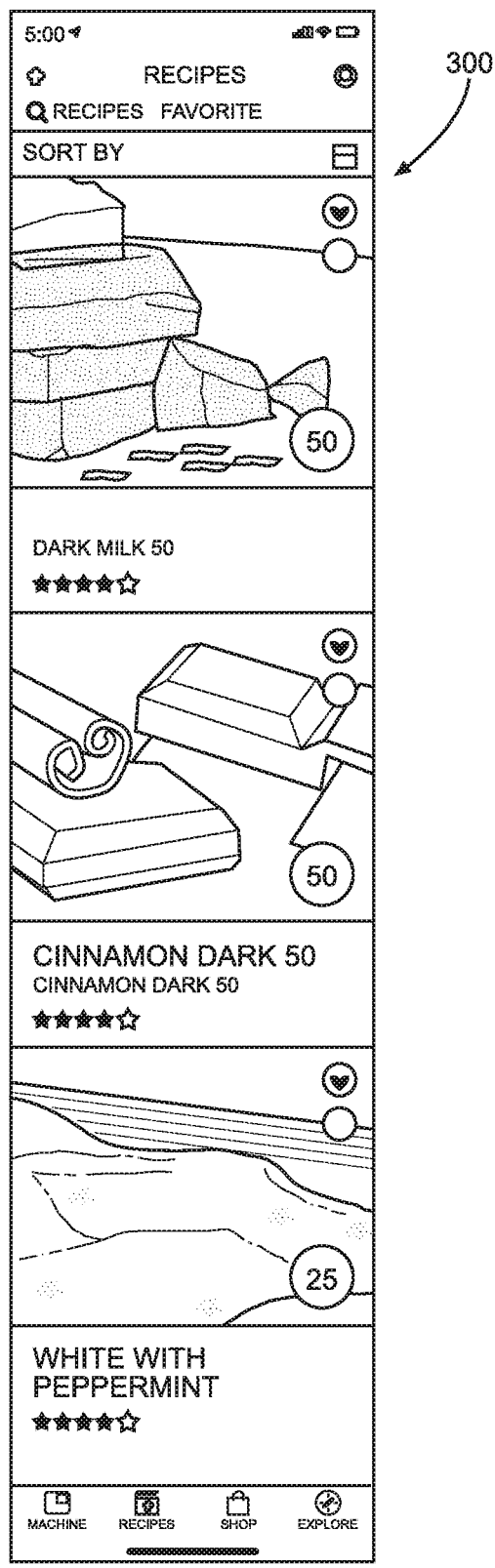
FIG. 3 is an exemplary view of an interactive graphical user interface for selecting a recipe for making chocolate.

FIG. 3 is an exemplary view of an interactive graphical user interface for selecting and managing chocolate recipes. Another exemplary function is a recipe section: that is, a recipe library and an interface to view and generate novel recipes. Users can navigate through a collection of recipes. There is a search and sort feature by name, type, by origin, by kind, etc. The user may search by such criteria as white, milk, dark, percentages, etc. A user may even "favorite" recipes, and transmit recipes to their machine and to other users. In some exemplary embodiments, a predefined list of recipes may be on the machine. On an application or website, by clicking a "send to my machine" button, a recipe may be transmitted to the machine, thus changing the list of stored recipes. The application or website may show the user a list of all of the recipes that have been loaded on the machine, as well as a library of recipes, shared recipes and allow manipulation of those lists.

FIG. 3 is an exemplary view of an interactive graphical user interface 300 for selecting a recipe for making chocolate.

Figure 4:
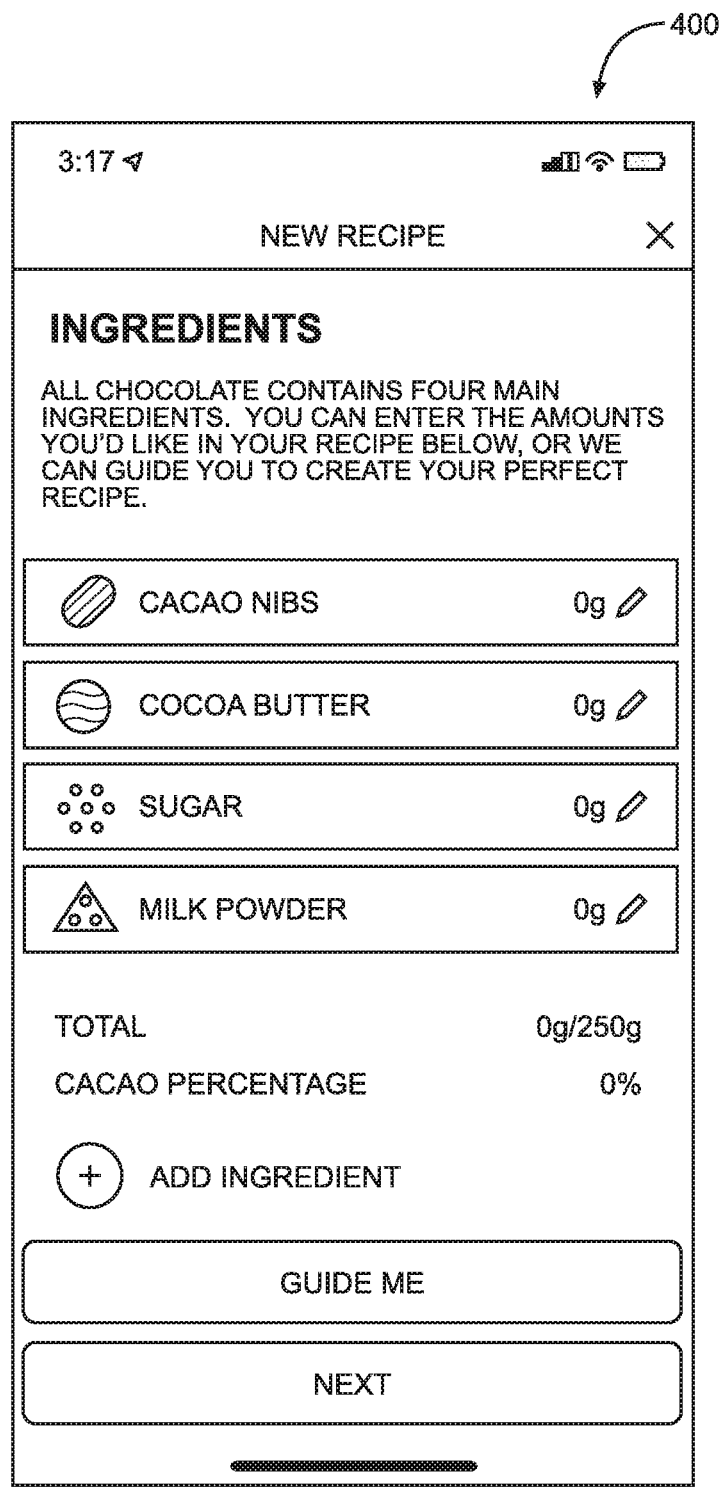
FIG. 4 is an exemplary view of an interactive graphical user interface for creating a custom chocolate recipe.

FIG. 4 is an exemplary view of an interactive graphical user interface 400 for creating a custom or guided chocolate recipe.

The custom recipe generation function, in some exemplary embodiments, may have two paths. One is an expert mode, and the other is a guided mode. On the expert mode, the user can directly input values into a custom recipe. For example, a user may indicate, by voice "I want to make chocolate with 50 grams of nibs, 50 grams of milk powder, and 50 grams of cocoa butter," or input the values directly. The system may calculate percentages on the fly, such as cacao percentage or machine 105 processing parameters based on the input ingredients and values. The user may add flavorings and inclusions as part of that custom recipe, as well as set the addition time(s) for one or more of the ingredients. The user may also customize an existing recipe to their particular desire.

Figure 5:
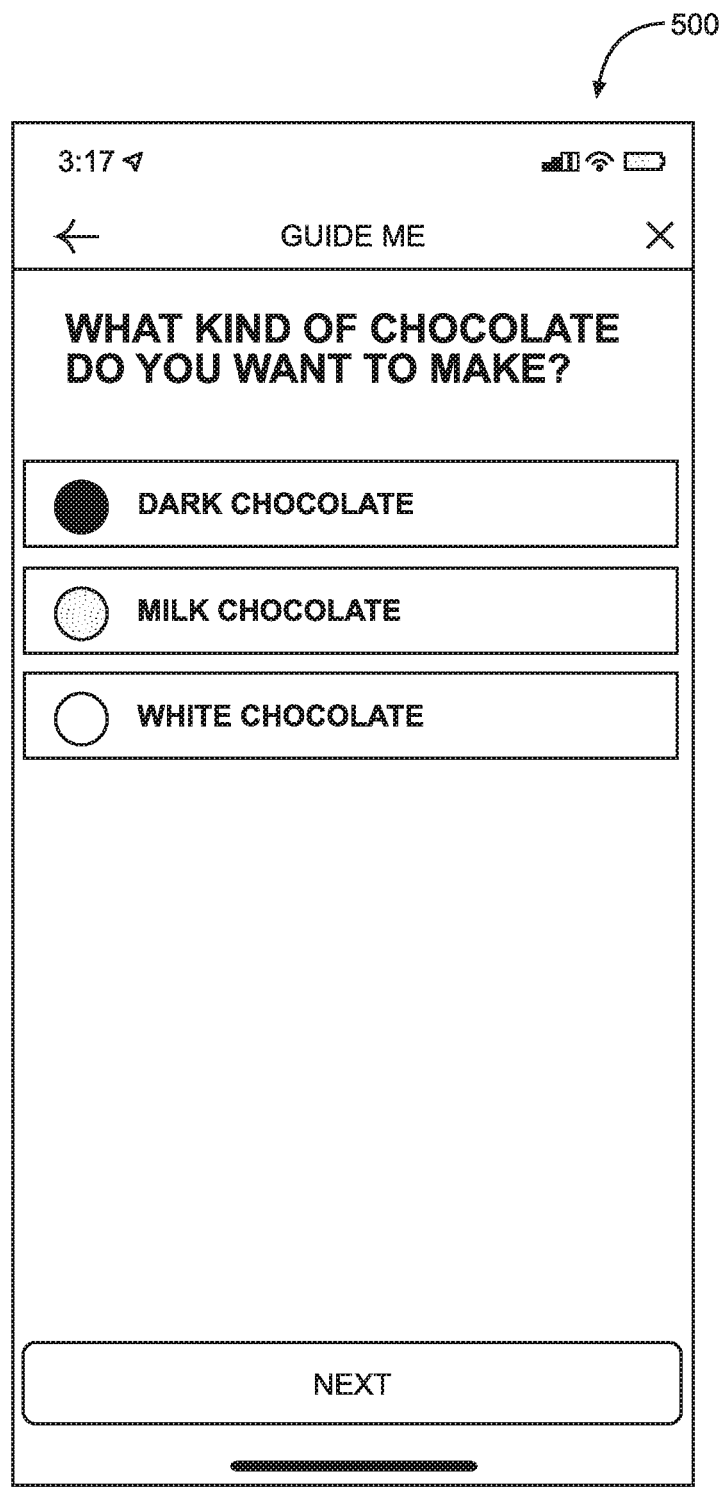
FIG. 5 is an exemplary view of an interactive graphical user interface for a guided method for creating a custom chocolate recipe.

FIG. 5 is an exemplary view of an interactive graphical user interface 500 for a guided method for making chocolate.

Figure 6:
FIG. 6 is an exemplary view of an interactive graphical user interface for a guided method for creating a custom chocolate recipe.

FIG. 6 is an exemplary view of an interactive graphical user interface 600 for a guided method for making chocolate.

Figure 7:
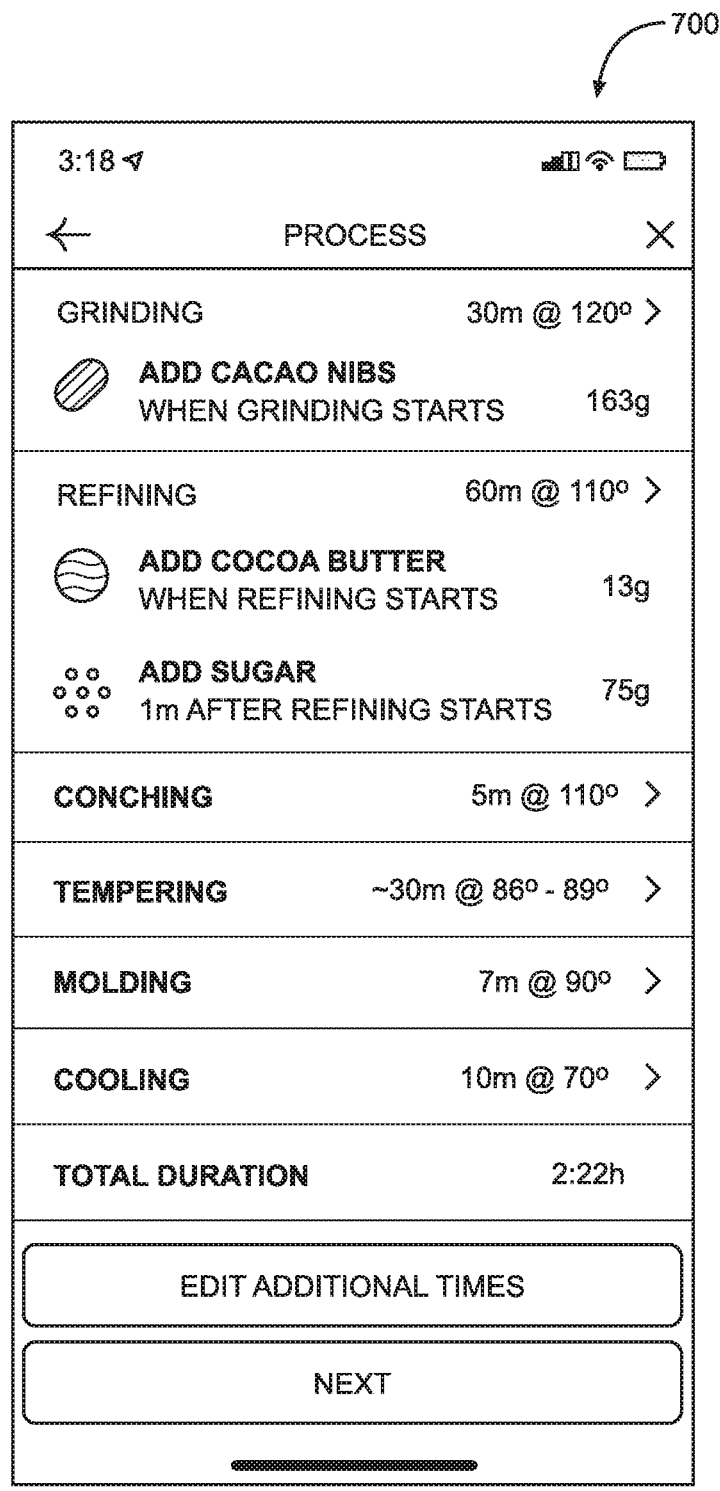
FIG. 7 is an exemplary view of an interactive graphical user interface for viewing and modifying chocolate processing parameters.

FIG. 7 is an exemplary view of an interactive graphical user interface 700 for setting chocolate processing parameters.

According to various exemplary embodiments, there are numerous functions of the software application 150 (FIG. 1). One exemplary function is active recipe status and monitoring. If a user starts a recipe, the interface on the chocolate-making machine 115 (FIG. 1) (the "machine") will be synchronized with the software application on the mobile device 105 (FIG. 1) (and may also be synchronized with the software application on the server 120 (FIG. 1)). The interfaces will show such things as the present step of the process, how many minutes are left in the process, temperature readings, any remaining actions and/or associated notifications and/or alerts for the user. The software system can also warn the user if the machine is not dry (after washing, for example) and activate a drying process. The software system can warn the user if the processing step is not proceeding properly (such as if the processing chamber is not spinning in stable state) and recommend solutions. The software system can also show a history of machine usage.

Figure 8:
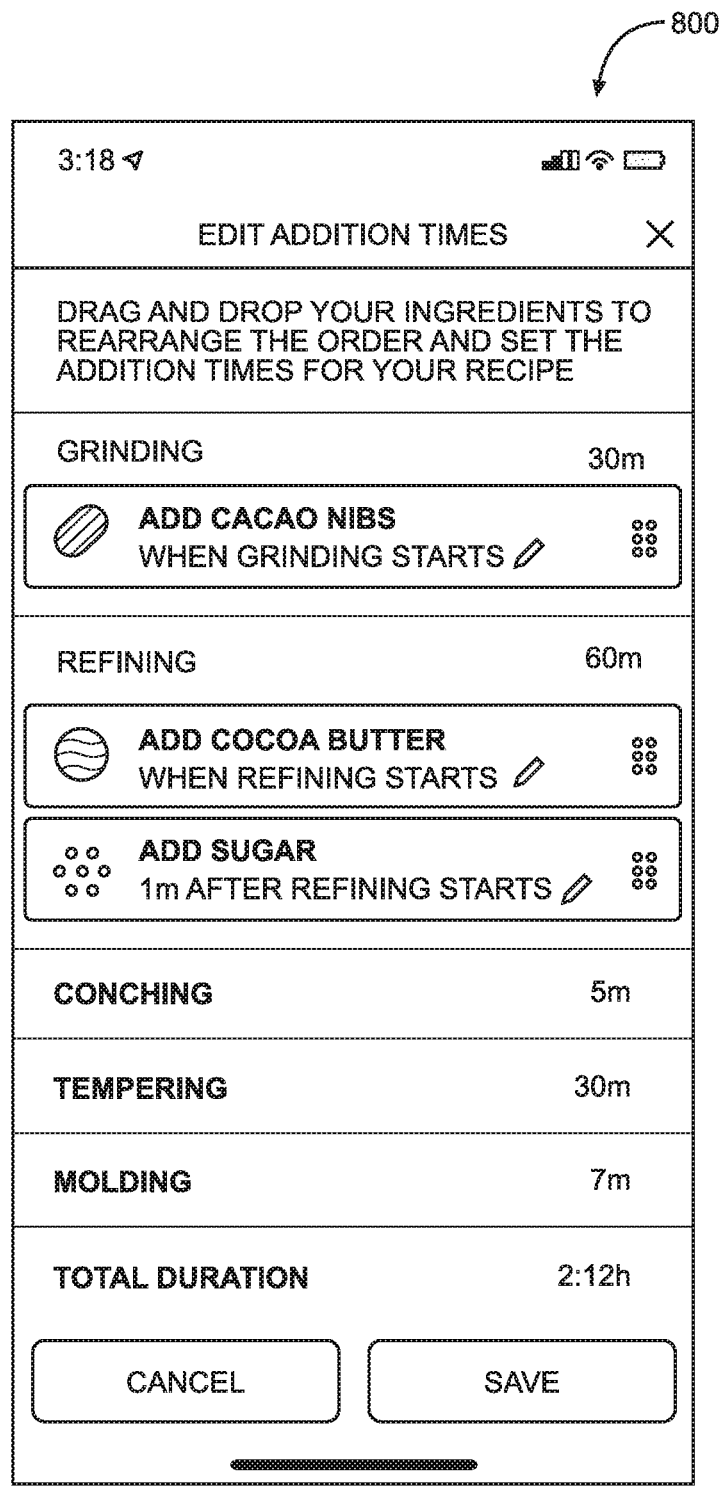
FIG. 8 is an exemplary view of an interactive graphical user interface for managing addition of ingredients when processing chocolate.

FIG. 8 is an exemplary view of an interactive graphical user interface 800 for managing addition of ingredients when processing chocolate.

The software system may provide default processing parameters to some or all of the processing steps. For example, in the steps of the chocolate-making process, there may be time, temperature, and speed value parameters. The user may choose to stay with the default parameters or the user may override one or more of the parameters and set it themselves to a new desired value. For example, the user may set how long a particular step is going to process, the temperature for a particular step, the speed of the motor, including whether or not to grind, refine, conche, temper and/or mold. In further exemplary embodiments, the user may change the order of the ingredient additions and the time they are added to the process. Such variables may also impact texture and/or flavor of the resulting chocolate. For example, a user may want a gritty chocolate which requires grinding the cacao nibs and adding sugar late in the process—so the user ends up with larger sugar crystals in the resulting chocolate. Thus, exemplary embodiments may include an ingredient ordering and timing interface. Further, exemplary embodiments may include "guardrails" and/or warnings if a custom recipe fails to satisfy a predetermined standard for successful processing.

Figure 9:
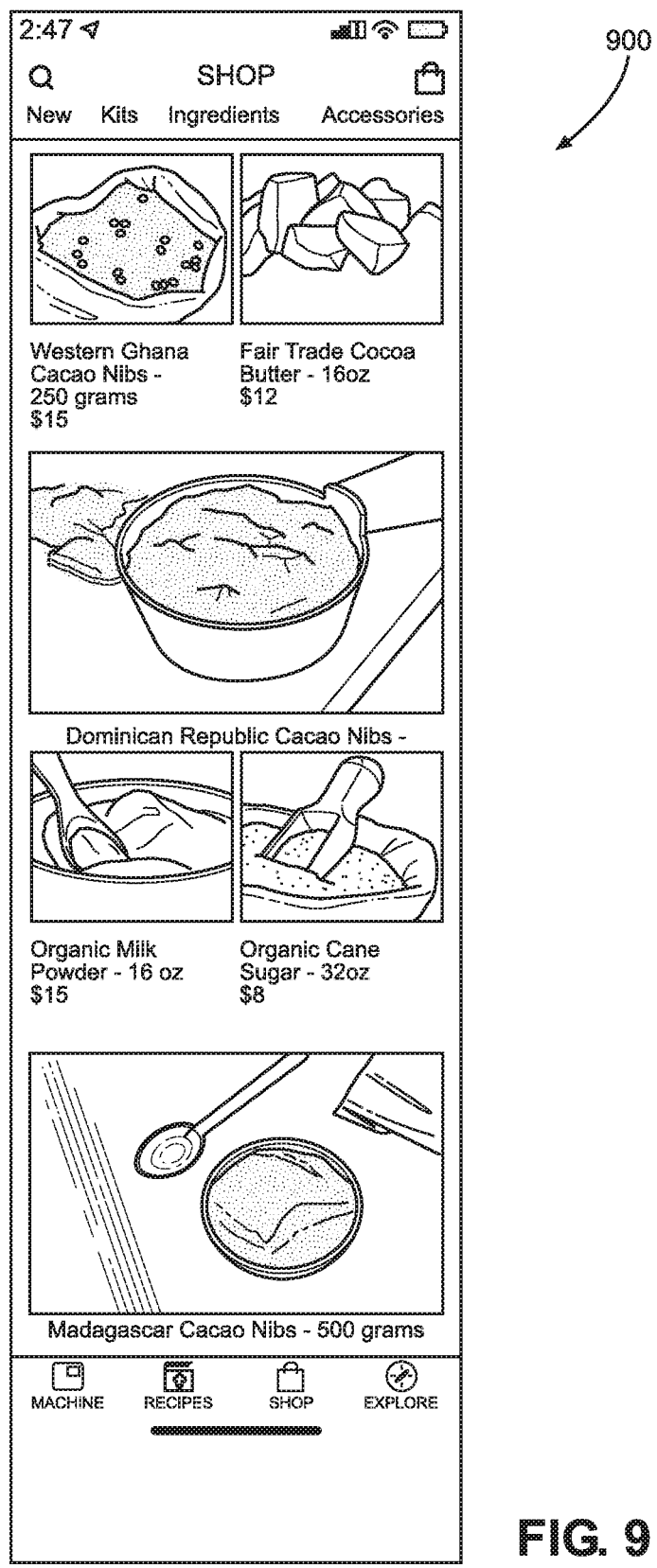
FIG. 9 is an exemplary view of an interactive graphical user interface for the purchasing of ingredients to make chocolate.

FIG. 9 is an exemplary view of an interactive graphical user interface 900 for the purchasing of ingredients to make chocolate as well as other chocolate accessories, such as boxes, molds, decorations, flavorings, inclusions, etc.

The e-commerce section of the application and/or website, according to various exemplary embodiments, may allow the user to buy such things as cocoa butter, milk powder, cocoa nibs, decorations, molds, and inclusions. Inclusions and flavorings being sold may include items such as nuts, dried fruits, ground vanilla, spices, CBD, THC, oils and concentrates. Recipes may be associated with specific items that are for sale, and specific items may be associated with particular recipes. The software may provide a feature where a button in a recipe can populate a shopping cart with all of the ingredients and materials to make that recipe. The software may allow users and third-parties to sell ingredients, accessories, recipes, mold designs, etc.

The e-commerce section of the application and/or website, according to various exemplary embodiments, may allow the user to buy decorations, such as transfer sheets, as well as standard and custom packaging, including boxes, foils, wraps, etc. Transfer sheets may include pre-designed or custom decorations, which can transfer an image, pattern, decoration or message to the chocolate. Colored or flavored cocoa butter may also be sold that the user can spray or paint into molds. For example, a Valentine's Day kit may be offered for sale, which could include a recipe for red chocolate, a heart mold, heart decorations and a heart shaped box. There may also be a variety of different designs the user can choose from, including custom designs that they can create, such as "Congratulations Jared!" or "Happy Birthday Dalia." Users may also upload designs or design custom transfer sheets, molds, boxes, etc. via the application or website.

Figure 10:
FIG. 10 is an exemplary view of an interactive graphical user interface for learning about chocolate.

FIG. 10 is an exemplary view of an interactive graphical user interface 1000 for learning about chocolate and cacao, such as history, science, economics, growing, etc.

The learning section of the application and/or website, according to various exemplary embodiments, may include an educational component. Using articles, videos and other forms of content, it may explain such topics as tempering and the science of tempering, the farming of cocoa in various locations, sustainability issues, chocolate science, processing questions, etc.

Figure 11:
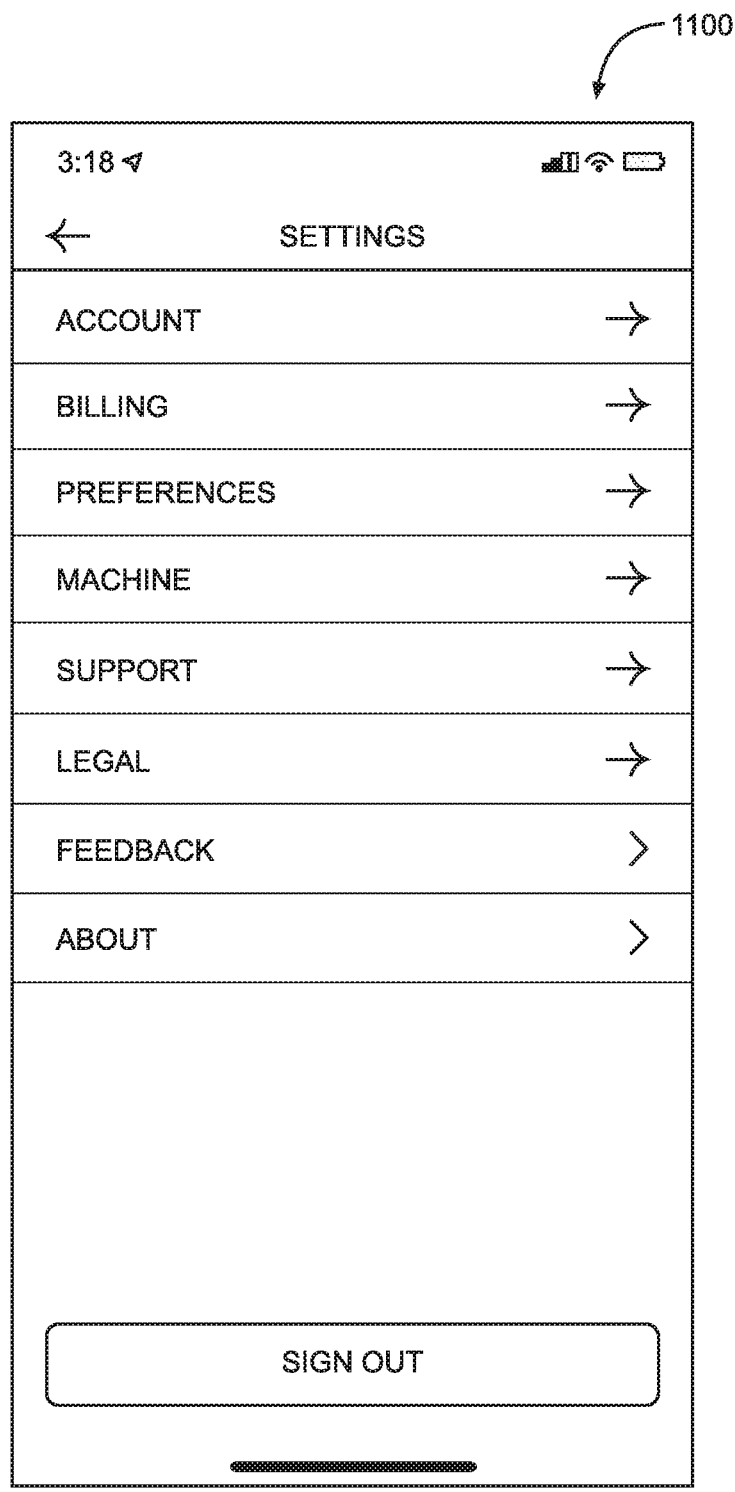
FIG. 11 is an exemplary view of an interactive graphical user interface for adjusting settings for the chocolate making machine, associated software on the client device and/or the machine.

FIG. 11 is an exemplary view of an interactive graphical user interface for adjusting settings for the chocolate making machine, associated software on the client device and/or the machine.

Figure 12:
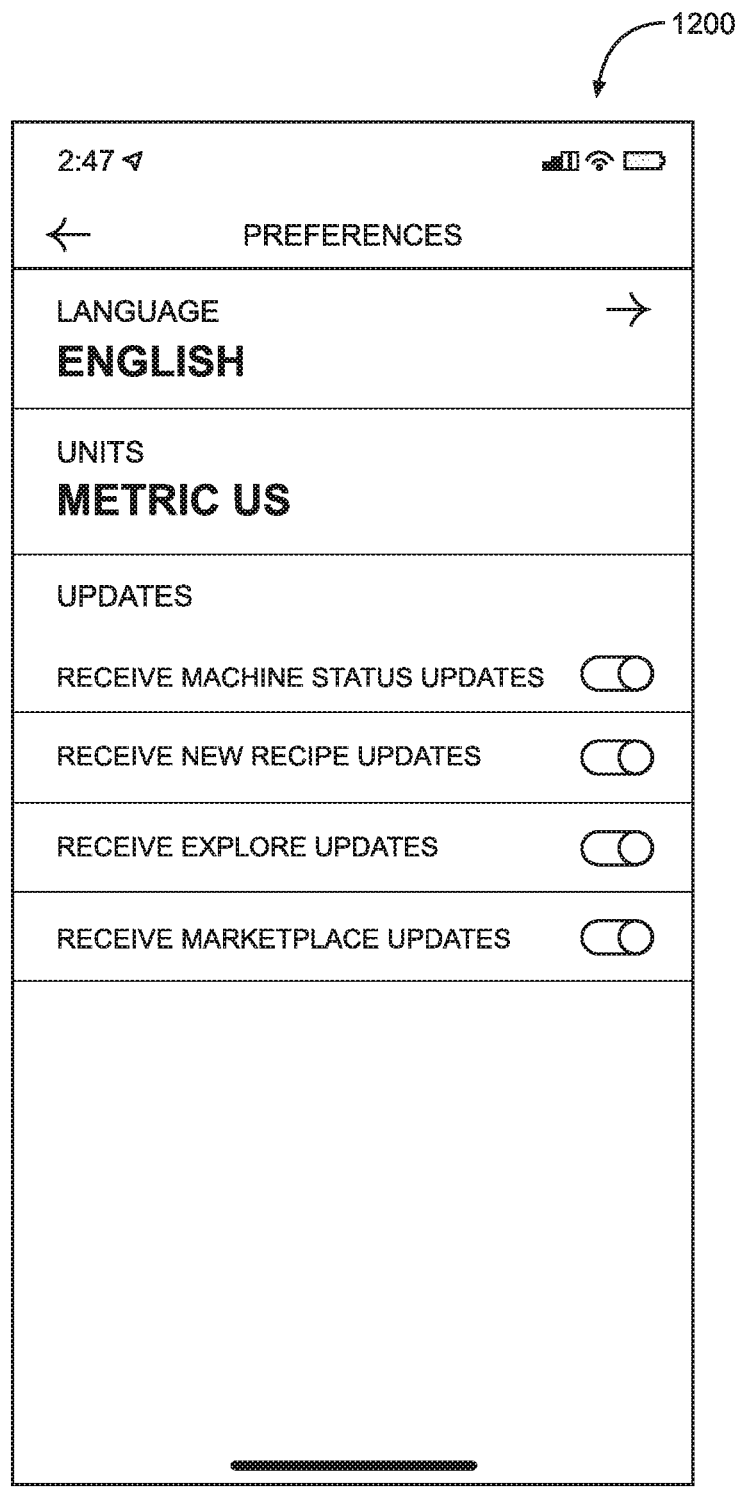
FIG. 12 is an exemplary view of an interactive graphical user interface for setting preferences for receiving information about chocolate making and the chocolate making machine.

FIG. 12 is an exemplary view of an interactive graphical user interface 1200 for setting preferences for receiving information about chocolate making and the chocolate making machine.

In some exemplary embodiments, the user will be able to set-up an account connected to their machine. The user may also be able to set-up their machine through their application and/or website, including having their machine on a network. In many exemplary embodiments, all of the functions on the application will also be on the associated website, client device or machine. For example, if a user can create a custom recipe on the application on the client device, they can also create a custom recipe from their tablet or from their desktop computer. The system may also be synchronized so that they can view a custom recipe created on one client device from another client device.

Figure 13:
FIG. 13 is an exemplary view of an interactive graphical user interface for selecting a recipe for making chocolate.

FIG. 13 is an exemplary view of an interactive graphical user interface 1300 for selecting a recipe for making chocolate.

The second custom recipe generation path may be a guided system. This system may ask the user a series of questions. Based on the answers provided by the user, the system will create a novel recipe. For example, a user can describe what kind of chocolate they want to make, but may not know how to translate that desire into numerical values for a recipe. Thus, the system may ask, "What kind of chocolate do you want to make? White, milk, dark?" This information may determine which of the ingredients are included or excluded. The system may also ask, "What percentage cacao do you want?" For example, the system may ask, "Do you want it bittersweet, 100 percent dark, sweet, etc.?" This information may be used to determine the amount of cocoa nibs required. The system may ask, "Do you want it a soft texture or firm texture?" This information may determine how much cocoa butter is required. Such information may be inputted on an application on the client device or website to generate a custom recipe that can then be transmitted to the server and to the machine. The user may also respond to voice prompts that will create a custom recipe based on user replies. A user may take a photo of their chocolate in connection with one or both of the above-described paths and assign it to their custom recipe. A user may also rate recipes and provide comments about the recipes. A user may provide attributes, tasting notes, descriptions and other details to their custom recipe.

Figure 14:
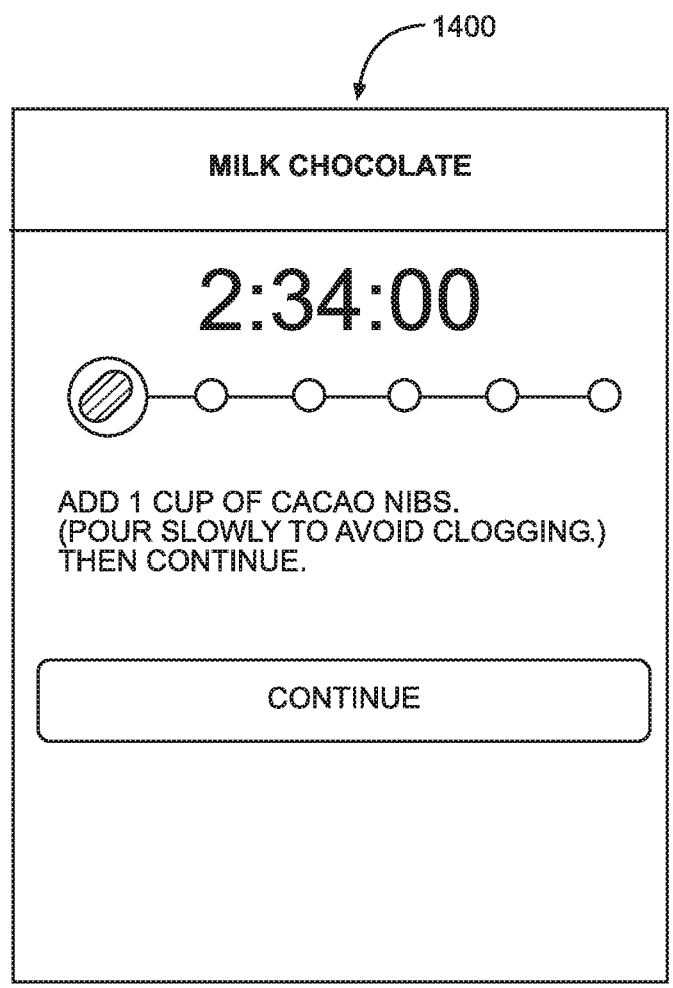
FIG. 14 is an exemplary view of an interactive graphical user interface for viewing instructions and viewing the status of the chocolate making process.

FIG. 14 is an exemplary view of an interactive graphical user interface 1400 for viewing instructions and viewing the status of the chocolate making process.

In further exemplary embodiments, the systems and methods described and illustrated herein will be intelligent and take into account that certain ingredients may need to be processed differently from other ingredients. For example, some cocoa nibs are known for their high viscosity and as a result this may limit the possible recipes that can be made using this particular ingredient. The systems and methods herein are going to generate custom recipes that will be optimized based on the ingredients and the inputs that are on the website and/or the application on the client device and the recipes that people are creating. For example, milk chocolate tempers at a different temperature than dark chocolate. Thus, the system will intelligently adjust the recipe's processing parameters as needed. The system may also use environmental factors such as room temperature, humidity, altitude, etc. to adjust recipes and processing parameters.

A digital chocolate community may be included with various exemplary embodiments. People may work with each other to create and test recipes and share recipes with each other. If a user creates a chocolate recipe that they like, they can share it to a public library and make it available to other people. Users may configure their software to send out an announcement (SMS, Email, social media post, etc.) when their chocolate is done.

Further embodiments may include a chocolate social network. Such a network may include ratings, reviews and stories that describe people's chocolate experiences, preferences and habits. The network may connect people who have similar taste in chocolate. The network could also predict which recipes a person will like based on their history and ratings of recipes. It may also recommend recipes based on profile matching to other people in the network who have similar taste in chocolate.

New software features, according to many exemplary embodiments, may reside on the hardware as part of a firmware update, on the application on the client device, and/or on the website. The features might be uploaded by proxy, meaning that the machine is a connected independent device on a network, and/or it might be tied to an application on the client device. For example, with Bluetooth, the user's mobile carrier connection to the user's mobile phone may connect to the machine. In some embodiments, if the machine is set-up as an object or as an Internet of Things ("IoT") device—it will have its own IP address. It may also receive such notifications as "There's a firmware update. Do you want to update it?" The user can do it directly from the machine. Alternatively, the machine can function offline as a standalone device. This being said, one of the advantages of having the machine connected is to provide status and alert notifications to the user when the user is away from the machine.

With respect to data capture, usage and third-party branding, the various exemplary systems and methods herein will capture user trends, such as what the users are making and associated recipes, as well as changes in recipe preferences over time. For example, the system may log what recipes people are making, how they rate recipes, time of day, when during the year they are making chocolate, etc. It may also provide information about regional behaviors and international differences, such as European consumption versus American consumption, East Coast consumption versus West Coast consumption, etc. It can also provide usage data based on holidays, such as Valentine's Day, Easter, Christmas and Halloween. The software system may also support A/B testing of different recipes. Users may be provided with one or more recipes to test and asked to provide feedback on the machine, an application on the client device, and/or the website. This feedback can be used to determine user preferences. Usage data may also be used to alert users when parts of the machine need to be replaced.

The exemplary systems and methods herein also include third-party branded recipes, such as a Starbucks™ chocolate mocha recipe. This may include branded recipe kits. That is, the user may buy a kit which has the chocolate and Starbucks™ coffee beans, and maybe even a mold or decorations that have the Starbucks™ logo on them.

Some of the interfaces provided herein may include "how to" videos that explain certain processes or recipes. This may include a display on the machine, the application on the client device, and/or the website. It may feature a famous chef making their favorite recipe.

In further exemplary systems and methods, multiple machines may be associated with an account. Conversely, one could have multiple accounts associated with a machine (such as in a family scenario). There may also be multiple accounts that are associated with multiple machines. In various exemplary embodiments, the back-end infrastructure includes accounts, recipes and machines, and may include a database that has some relational connections between those objects. In some situations, the database may be private and in others, it may be stored in the cloud. In some other cases, user interaction over the network may be moderated. In further exemplary systems and methods, multiple machines may be run simultaneously from one control interface.

Various exemplary embodiments include a custom recipe creation GUI that allows users to set parameters, such as time, temperature, and speed, in a visual way, as opposed to typing in numerical values of parameters. Users may move a slider, in a graphical approach to set parameter values. The parameters may be displayed as a plot of values on a curve, such as the temperature, length of time, etc. The graphical curves could be interrelated and interactively manipulated by the user to generate a custom recipe. Custom recipes may be viewed graphically.

The exemplary software herein may also include awarding users virtual badges. In part, it would provide for the gamification of chocolate-making, or it could be part of a culinary school program where a series of tasks or actions must be completed.

The machine software may also include algorithms (such as logic 140 (FIG. 1)) for temperature management using sensors that are providing temperature data. It may include a feedback control loop for processes such as tempering. For example, an algorithm may indicate to heat to 84 degrees Fahrenheit and hold it there for two minutes and at a certain speed, etc.

The systems and methods herein may also include software for particle size and/or distribution analysis. For example, a microscope, spectrometer, or camera on a mobile device or built into the machine may capture images or other data about the chocolate to try to determine particle size. Among other things, this may be used to determine whether the chocolate-making process has reached a target value. This information may also be used as feedback for other parts of the process, such as the grinding or tempering. The camera may also capture video or still images of the process and allow the user to view and/or save the content.

The software system may also include artificial intelligence for such things as using motor torque or motor current measurements to determine particle size. For example, as viscosity changes, one can measure the torque on the motor and by using recipe data, the software can perform a calculation of the particle size. Artificial intelligence software may also get input from various hardware sensors and data loggers (video camera, temperature sensors, microphone, current sensing, etc.) to determine characteristics or state of chocolate, such as temperature or temper.

In further exemplary embodiments, there is frictional heat that is generated through the movement of the machine parts, such as grinding media in the machine. The viscosity of the chocolate affects the movement of the media which in turn changes the frictional heat generation and thus the temperature of the chocolate. The machine also manipulates temperature through the active heating/cooling system. An analysis can be performed of heating/cooling requirements or chocolate temperature as the chocolate becomes more or less viscous over the processing steps. Using software, particle size can be calculated based on temperature data analysis, using input such as frictional heat generation.

The resistance in the motor can also be used to determine the state of the chocolate such as viscosity. For example, if the chocolate is too viscous—in other words too much resistance is detected in the motor—the machine can advise the user to add more cocoa butter. Thus, this is a software control and safety check system based on hardware measurements, such as motor torque readings.

In other exemplary embodiments, established recipe composition and processing parameter windows may advise the user if a particular recipe may work well or not.

Other exemplary features of the software described herein include:

The software may include a professional interface for chocolate makers and other professionals who desire more data about a recipe that is in process. The application on the client device and machine GUI may provide a "consumer" interface, as well as a secondary interface and allow the user to switch between the two. The secondary or "professional" interface may include: manual controls of hardware (motor, thermal system, fans, etc.); data log files of chocolate batch (time, temperature, and speed settings); real-time sensor/state values (temperatures, motor speed, etc.); and/or real-time graphing of a chocolate processing data (e.g. plot of chocolate temperature over time, etc.).

The exemplary software herein may promote, highlight and display recipes on the machine, application or website interface pushed from the server.

The exemplary software herein may display advertising on the machine, application or website interface. Advertising may be targeted based on a user's chocolate preferences, as determined from the user profile, recipes made, purchase history, etc. Advertising may promote products (such as chocolate-making ingredients), recipes (such as proprietary recipes that require payment to access) or services (such as chocolate-making or chocolate tasting classes).

The exemplary software herein may help users manage their ingredients and recipes. Users may build a custom subscription to receive a different package of nibs and other ingredients each month or other regular cycle. The software system can predict when it is time to reorder ingredients based on usage and remind users to place an order. The software system may auto-order ingredient for users based on some predefined set of parameters.

The exemplary software herein may match a code on an ingredient pod (kit with all the ingredients) and download the recipe(s) for that kit to the machine. The software may also scan a code on the ingredient packaging to find recipes that are designed for that ingredient (such as recipes that are designed for particular cocoa nibs). The systems and methods herein may also include software to help users measure and scale recipes appropriately. Using integrated weight sensors, the software may automatically measure out ingredients stored in an ingredient hopper based on recipe values. The software may also allow users to pair a scale with their machine to guide them through the measurement process. In the case of an over-pour or under-pour situation, the software can auto-scale a recipe based on how much is poured into the machine. The software may also automatically scale ingredient amounts based on final batch size. The software system may also convert between mass and volumetric measurement systems for recipe ingredient amounts.

The systems and methods herein may also include software to help users schedule different functions of the machine, such as the automated start of a recipe.

The systems and methods herein may also include software to help users control different functions of the machine using voice commands.

In the description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A computing device comprising a processor, a memory and a display, the computing device being configured to dynamically display an interactive graphical user interface, the memory storing instructions that cause the processor to perform operations comprising;
    receiving a first input via the interactive graphical user interface to guide a user in creating a chocolate recipe;
    in response to receiving the first input, displaying via the interactive graphical user interface a plurality of types of chocolate products and a prompt to select one of the types of chocolate products;
    receiving a second input including an entry of a desired type of chocolate product to be prepared;
    in response to the second input, displaying via the interactive graphical user interface a plurality of characteristics of the chocolate product;
    receiving a third input indicating a desired characteristic of the chocolate product;
    automatically generating a custom recipe based on the received inputs, the custom recipe comprising an amount for each of a plurality of ingredients, and a plurality of food preparation steps;
    wherein the custom recipe instructs an automated food preparation machine to prepare the chocolate product.

2. The computing device of claim 1, wherein the operations further comprise:
    receiving via the interactive graphical user interface a fourth input to modify the food preparation step of the custom recipe; and
    modifying the custom recipe based on the fourth input.

3. The computing device of claim 1, wherein the desired characteristic includes appearance, flavor, texture, nutrition, or aroma.

4. The computing device of claim 1, wherein the operations further comprise transmitting the custom recipe to a food preparation machine.

5. The computing device of claim 1, wherein the operations further comprise transmitting the custom recipe to a server system.

6. The computing device of claim 1, wherein the operations further comprise saving, storing, and synchronizing the custom recipe on the computing device, a server system, and a food preparation machine.

7. The computing device of claim 1, wherein a food preparation step comprises an instruction to the user.

8. The computing device of claim 1, wherein the instruction is for grinding, refining, conching, tempering, or molding.

9. The computing device of claim 1, wherein the operations further comprise receiving ingredient information from a scan of a package for an ingredient or from purchase of an ingredient from an e-commerce source and to automatically generate a recipe or select an existing recipe.

10. The computing device of claim 1, wherein the operations further comprise automatically purchasing an ingredient from an e-commerce source based on the custom recipe.

11. The computing device of claim 1, wherein the interactive graphical user interface is configured to receive an input that will modify the order of addition of ingredients of the custom recipe.

12. The computing device of claim 1, further comprising a food preparation machine configured to execute the custom recipe.

13. The computing device of claim 12, wherein the food preparation machine is configured to automatically transmit to the computing device device a status of processing the food or an instruction to the user, and wherein the interactive graphical user interface is configured to display the status or the instruction.

14. The computing device of claim 1, wherein the operations further comprise:
    displaying via the interactive graphical user interface the custom recipe;
    receiving a fourth input indicating a desired type of ingredient to be added to or removed from the custom recipe; and
    modifying the custom recipe based on the fourth input.

15. The computing device of claim 1, wherein the operations further comprise automatically determining if the custom recipe fails to satisfy a predetermined standard for successful processing.

16. A computer-implemented method comprising;
    receiving a first input via an interactive graphical user interface to guide a user in creating a chocolate recipe;
    in response to receiving the first input, displaying via the interactive graphical user interface a plurality of types of chocolate product and a prompt to select one of the types of chocolate product;
    receiving a second input including an entry of a desired type of chocolate product to be prepared;
    in response to the second input, displaying via the interactive graphical user interface a plurality of characteristics of the chocolate product;

receiving a third input indicating a desired characteristic of the chocolate product;

automatically generating a custom recipe based on the received inputs, the custom recipe comprising an amount for each of a plurality of ingredients, and a plurality of food preparation steps, wherein the custom recipe instructs an automated food preparation machine to prepare the chocolate product.

17. The computer-implemented method of claim 16, wherein the operations further comprise:

receiving via the interactive graphical user interface a fourth input to modify the food preparation step of the custom recipe; and modifying the custom recipe based on the fourth input.

18. The computer-implemented method of claim 16, wherein the desired characteristic includes appearance, flavor, texture, nutrition, or aroma.

19. The computer-implemented method of claim 16, further comprising transmitting the custom recipe to a food preparation machine.

20. The computer-implemented method of claim 19, further comprising:

receiving from the food preparation machine a status or an instruction for the user; and displaying via the interactive graphical user interface the status or the instruction.

21. The computer-implemented method of claim 16, further comprising:

displaying via the interactive graphical user interface the custom recipe;

receiving a fourth input indicating a desired type of ingredient to be added to or removed from the custom recipe; and modifying the custom recipe based on the fourth input.

\* \* \* \* \*

UNITED STATES PATENT AND TRADEMARK OFFICE
CERTIFICATE OF CORRECTION

PATENT NO. : 11,470,853 B2
APPLICATION NO. : 16/817301
DATED : October 18, 2022
INVENTOR(S) : Nathaniel Mark Saal et al.

It is certified that error appears in the above-identified patent and that said Letters Patent is hereby corrected as shown below:

In the Claims

In Column 11, in Claim 1, Line 42, delete "memory" and insert -- memory, --, therefor.

In Column 12, in Claim 13, Line 40, delete "device device" and insert -- device --, therefor.

Signed and Sealed this
Fifth Day of November, 2024

Katherine Kelly Vidal
*Director of the United States Patent and Trademark Office*